US008278020B2

(12) United States Patent
Wosnick

(10) Patent No.: US 8,278,020 B2
(45) Date of Patent: Oct. 2, 2012

(54) POLYESTER SYNTHESIS

(75) Inventor: Jordan H. Wosnick, Toronto (CA)

(73) Assignee: Xerox Corporation, Norwalk, CT (US)

( * ) Notice: Subject to any disclaimer, the term of this patent is extended or adjusted under 35 U.S.C. 154(b) by 1057 days.

(21) Appl. No.: 12/207,959

(22) Filed: Sep. 10, 2008

(65) Prior Publication Data

US 2010/0062358 A1 Mar. 11, 2010

(51) Int. Cl.
*G03G 9/08* (2006.01)

(52) U.S. Cl. ............. 430/137.15; 430/137.1; 430/109.2; 430/109.4

(58) Field of Classification Search ............. 430/137.15, 430/137.1, 109.2, 109.4
See application file for complete search history.

(56) References Cited

U.S. PATENT DOCUMENTS

| 3,590,000 | A | 6/1971 | Palermiti et al. |
| 3,655,374 | A | 4/1972 | Palermiti et al. |
| 3,720,617 | A | 3/1973 | Chatterji et al. |
| 3,983,045 | A | 9/1976 | Jugle et al. |
| 4,295,990 | A | 10/1981 | Verbeek et al. |
| 4,563,408 | A | 1/1986 | Lin et al. |
| 4,584,253 | A | 4/1986 | Lin et al. |
| 5,290,654 | A | 3/1994 | Sacripante et al. |
| 5,302,486 | A | 4/1994 | Patel et al. |
| 5,346,797 | A | 9/1994 | Kmiecik-Lawrynowicz et al. |
| 5,364,729 | A | 11/1994 | Kmiecik-Lawrynowicz et al. |
| 5,403,693 | A | 4/1995 | Patel et al. |
| 5,418,108 | A | 5/1995 | Kmiecik-Lawrynowicz et al. |
| 5,501,935 | A | 3/1996 | Patel et al. |
| 5,527,658 | A | 6/1996 | Hopper et al. |
| 5,585,215 | A | 12/1996 | Ong et al. |
| 5,650,255 | A | 7/1997 | Ng et al. |
| 5,650,256 | A | 7/1997 | Veregin et al. |
| 6,004,714 | A | 12/1999 | Ciccarelli et al. |
| 6,063,827 | A | 5/2000 | Sacripante et al. |
| 6,120,967 | A | 9/2000 | Hopper et al. |
| 6,190,815 | B1 | 2/2001 | Ciccarelli et al. |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 7,306,887 | B2 | 12/2007 | Tanaka et al. |
| 2005/0227157 | A1 | 10/2005 | Shirai |
| 2006/0222991 | A1 | 10/2006 | Sacripante et al. |
| 2007/0184377 | A1 | 8/2007 | Shu et al. |
| 2008/0118857 | A1 | 5/2008 | Liu et al. |

FOREIGN PATENT DOCUMENTS

| JP | 05 287055 | 11/1993 |
| WO | WO 98/42766 | 10/1998 |

OTHER PUBLICATIONS

Canadian Patent Office Communication dated May 6, 2011, for related Canadian Patent application No. 2,677,587, 2 pages.
Abstract of Japanese Patent 2007193315, published Aug. 2, 2007, of Fukuoka Hirotake et al., 1 page.
European Search Report for European Patent No. EP 09 16 9868 dated Dec. 15, 2009.

*Primary Examiner* — Mark A Chapman

(57) ABSTRACT

The present disclosure provides methods for modifying polymeric resin materials after polymerization to make fine adjustments in the chemical or physical properties of the resin, or in modifying the structure of the polymer chains. The resulting resins may be useful in forming toner particles. In embodiments, a polymeric resin may have epoxy groups added to its backbone to increase its melting point. The resulting polymer, sometimes referred to herein as an epoxidized polymer, may, in turn, be reacted with wax-like components, to increase the compatibility of the polyester with waxes utilized in forming toner particles. In other embodiments, the resulting epoxidized polymer may be reacted with components possessing carboxylic acid groups to adjust the acid value and weight average molecular weight of the resin.

19 Claims, No Drawings

POLYESTER SYNTHESIS

BACKGROUND

The present disclosure is generally directed to polyester synthesis processes and, more specifically, to processes for the modification of polyester resins which, in turn, may be utilized in the formation of emulsion aggregation toners.

Electrophotographic printing, including xerographic printing, utilizes toner particles which may be produced by a variety of processes. One of the processes is an emulsion aggregation ("EA") process that forms acrylate based, e.g., styrene acrylate, toner particles in which surfactants are used in forming the latex emulsion. See, for example, U.S. Pat. No. 6,120,967, the disclosure of which is hereby incorporated by reference in its entirety, as one example of such a process. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935, the disclosures of each of which are hereby incorporated by reference in their entirety.

Combinations of amorphous and crystalline polyesters may also be used in the EA process to form low-melt polyester toners. This resin combination provides toners with high gloss and relatively low-melting point characteristics, which allow for more energy efficient and faster printing. However, some resins may be incompatible with other components of a toner particle, for example waxes used therein. Therefore there is a continual need for improving polyester resin synthesis, as well as improving the compatibility of the resins with other components of toner particles.

SUMMARY

The present disclosure provides methods for modifying resins suitable for use in forming toner particles, and toners produced with such resins. In embodiments, a process of the present disclosure may include contacting at least one unsaturated polyester with at least one epoxidizing agent such as peroxyacids, peroxyphthalates, hydrogen peroxide and a suitable catalyst, and combinations thereof to form an epoxidized polyester resin, contacting the epoxidized polyester resin with at least one colorant, an optional wax, and an optional surfactant to form toner particles, and recovering the toner particles.

In other embodiments, a process of the present disclosure may include contacting at least one unsaturated polyester with at least one epoxidizing agent such as peroxyacids, peroxyphthalates, hydrogen peroxide and a suitable catalyst, and combinations thereof to form an epoxidized polyester resin, contacting the epoxidized polyester resin with a component such as wax-like components and components possessing carboxylic acid groups to form a modified epoxidized polyester resin, contacting the modified epoxidized polyester resin with at least one colorant, an optional wax, and an optional surfactant to form toner particles, and recovering the toner particles.

In embodiments, a toner of the present disclosure may include an epoxidized polyester resin optionally in combination with at least one other resin such as amorphous polyester resins and crystalline polyester resins, and one or more optional ingredients such as colorants, waxes, and combinations thereof.

DETAILED DESCRIPTION

The present disclosure provides methods for modifying polymeric resin materials after polymerization to make fine adjustments in the chemical or physical properties of the resin, or in modifying the structure of the polymer chains. In embodiments, a polymeric resin, such as a polyester resin utilized in forming an emulsion-aggregation low-melt polyester toner, may be epoxidized to increase its melting point. Epoxidation, as used herein, includes reacting alkene, i.e., unsaturated groups, found in the polymer backbone with a suitable epoxidizing agent, in some embodiments a peroxyacid, a peroxyphthalate, or hydrogen peroxide and a suitable catalyst, and/or combinations thereof, to form an epoxy group. The resulting polymer, sometimes referred to herein as an epoxidized polymer, may, in turn, be reacted with wax-like components, for example alcohols such as long-chain aliphatic alcohols, to increase the compatibility of the polyester with other waxes utilized in forming toner particles. In other embodiments, the resulting epoxidized polymer may be reacted with components possessing carboxylic acid groups to adjust the acid value and weight average molecular weight of the resin.

Resins

Any monomer or starting material suitable for preparing a latex for use in a toner may be utilized. In embodiments, the resin of the latex may include at least one polymer. In embodiments, at least one polymer may be from about one to about twenty and, in embodiments, from about three to about ten. Suitable resins include polyester resins, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860. the disclosure of which is hereby incorporated by reference in its entirety.

In embodiments, the resin may be a polyester resin formed by reacting a diol with a diacid in the presence of an organic catalyst, in embodiments an enzyme. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1, 2-ethanediol, sodio 2-sulfo-1,3-propanediol, lithio 2-sulfo-1, 3-propanediol, potassio 2-sulfo-1,3-propanediol, mixture thereof, and the like. The aliphatic diol may be, for example, selected in an amount of from about 45 to about 50 mole percent of the resin, and the alkali sulfo-aliphatic diol can be selected in an amount of from about 0 to about 10 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, in embodiments from about 40 to about 60 mole percent, in embodiments from about 42 to about 52 mole percent, in embodiments from about 45 to about 50 mole percent, and the alkali sulfo-aliphatic diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly (ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example in an amount of from about 5 to about 30 percent by weight of the toiler components, in embodiments from about 15 to about 25 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 2 to about 4.

Examples of diacid or diesters including vinyl diacids or vinyl diesters selected for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 52 mole percent of the resin, in embodiments from about 45 to about 50 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diol selected can vary, and may be, for example, from about 45 to about 52 mole percent of the resin.

Catalysts which may be utilized in forming either the crystalline or amorphous polyesters include enzymes described in greater detail below.

In embodiments, an unsaturated polyester resin may be utilized as a latex resin, optionally in combination with another resin. As used herein, an unsaturated polymer resin has at least one alkene group, that is, a C=C bond, in its backbone. Examples of such resins include those disclosed in U.S. Pat. No. 6,063,827, the disclosure of which is hereby incorporated by reference in its entirety. Exemplary unsaturated polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

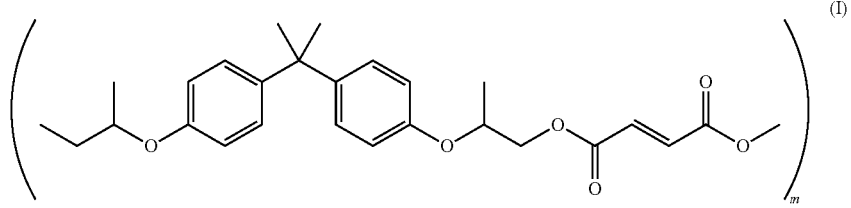

wherein m may be from about 5 to about 1000.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C. and the like.

Suitable crystalline resins include those disclosed in U.S. Patent Application Publication No. 2006/0222991, the disclosure of which is hereby incorporated by reference in its entirety. In embodiments, a suitable crystalline resin may include a resin composed of ethylene glycol and a mixture of dodecanedioic acid and fumaric acid co-monomers with the following formula:

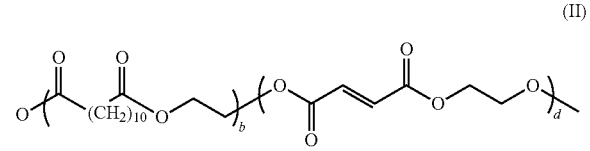

wherein b is from 5 to 2000 and d is from 5 to 2000.

For example, in embodiments, a poly(propoxylated bisphenol A co-fumarate) resin of formula I as described above may be combined with a crystalline resin of formula II to form a core.

Enzymatic Synthesis

In embodiments the resin may be produced by enzymatic polymerization in the presence or absence of a solvent. Suitable starting materials useful in forming a latex, and thus the resulting latex particle, optionally in an emulsion, include, but are not limited to, monomers having at least two carboxyl groups, dicarboxylic acids or corresponding esters in combination with glycols, oxyacids, oxyacid esters, lactones, lactides, macrolides, combinations thereof, and the like. Diacids and diesters which may be utilized include those described above.

In embodiments, oxyacids which may be utilized to form polyester resins in accordance with the processes of the present disclosure include, but are not limited to, 3,-hydroxybutanoic acid, 4-hydroxybutanoic acid, 3-hydroxyvaleric acid, 4-hydroxyvaleric acid, 5-hydroxyvaleric acid, 6-hydroxyhexanoic acid, 10-hydroxydecanoic acid, 11-hydroxyundecanoic acid, 12-hydroxydodecanoic acid, 15-hydroxypentadecanoic acid, combinations thereof, and the like.

In other embodiments, polymers for use in forming the resins may be 6-, 12-, 13-, 16-, and 17-membered lactones or macrolides. In embodiments, suitable starting materials for forming the resins include lactones having a core based upon 16-hydroxyhexadec-9-enoic acid. Other suitable lactones include caprolactone, pentadecalactone, hexadecenlactone, pentadecenlactone, combinations thereof, and the like. The resulting polylactones, for example, poly(pentadecalactone), poly(hexadecenlactone), and the like, may have a molecular weight of about 2,000 or above, in embodiments from about 5,000 to about 50,000, in embodiments from about 10,000 to about 30,000.

Where utilized, enzymes utilized in the enzymatic synthesis serve as a catalyst in forming the polyester resins. Suitable enzymes to form polyesters include *Pseudomonas* family lipases, such as lipases from *Pseudomonas aeruginosa* (lipase PA), *Pseudomonas cepacia* (lipase PC), *Pseudomonas fluorescens* (lipase PF), as well as lipases from *Aspegillus niger* (lipase A), *Candida antarctica* (lipase CA or lipase B), *Candida cylindracea* (lipase CC), *Klebsiella oxytoca* (lipase K), *Mucor meihei* (lipase MM), cutinase from *Humicola insolens*, combinations thereof, and the like.

In embodiments, the lipase may be immobilized on a support member such as porous polymer beads, acrylic resins, cross-linked polystyrene, or any other suitable polymeric and/or ceramic supports within the purview of those skilled in the art.

The lipases may be obtained from the above organisms utilizing methods within the purview of those skilled in the art. In embodiments, the organisms may be grown in incubation vessels and fed with nutrients and sugars (e.g., glucose). By selecting the right growth and treatment conditions, lipases may be obtained from the organisms. In other embodiments, the lipases may be obtained from commercial sources, for example, Fluka BioChemika, Novozymes, and/or Sigma Aldrich.

The lipases utilized to catalyze formation of the polyester resins are able to operate at temperatures of from about 10° C. to about 100° C., in embodiments from about 20° C. to about 90° C., in other embodiments from about 45° C. to about 75° C. One advantage of the immobilized lipases that distinguishes them from other conventional catalysts is they can be separated from the product and re-used.

In embodiments, the amount of lipase enzyme utilized to catalyze a reaction may be from about 0.1% by weight to about 10% by weight based on the starting materials used to generate the polyester resin, in embodiments from about 1% by weight to about 6% by weight based on the starting materials used to generate the polyester resin.

Reaction Conditions

In embodiments, the latex resins may be produced by emulsion polymerization methods, including those disclosed in U.S. Pat. Nos. 6,063,827, 6,830,860, and U.S. Patent Application Publication No. 2006/0222991. the disclosures of each of which are hereby incorporated by reference in their entirety.

In other embodiments, the starling materials utilized to form the polyester resin, for example the diacids and diols, oxyacids, and lactones described above, may be combined with the above enzymes and a polyester may be formed by an enzymatic polymerization process. The enzymatic polymerization may be performed in the presence or absence of solvents.

In the enzymatic polymerization process, the reactants may be added to a suitable reactor, such as a mixing vessel. The appropriate amount of starting materials may be optionally dissolved in a solvent, a lipase based enzyme may be added to the solution, and a polyester formed which may then be used in the production of a toner. In other embodiments the starting materials may be combined with the lipase enzyme without solvent and a polyester formed.

Where utilized, suitable solvents include, but are not limited to, water and/or organic solvents including toluene, benzene, xylene, tetrahydrofuran, combinations thereof, and the like.

Where the starting materials are in solution, the starting materials may be at a concentration of from about 10% by weight to about 90% by weight, in embodiments frm about 30% by weight to about 60% by weight.

Examples of the enzymatic polymerization of various starting materials are depicted below. For example the enzymatic polymerization of a dicarboxylic acid and a glycol or diol may proceed as follows:

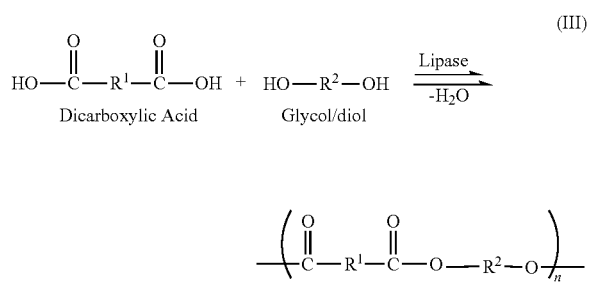

(III)

The enzymatic polymerization of an oxyacid may proceed as follows:

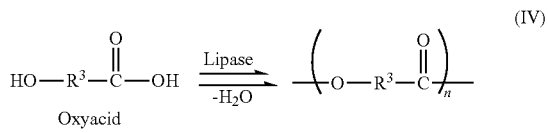

(IV)

Finally, the enzymatic polymerization of a lactone may proceed as follows:

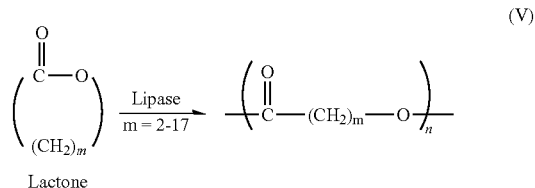

(V)

In embodiments, lactones having from about 2 to about 17 members may be catalyzed by the lipase enzyme to synthesize polylactones.

The time for the reaction may depend upon the type and amount of starting materials utilized, the amount of enzyme utilized, temperature, and the like. In embodiments, the reaction mixture may be mixed for from about 1 minute to about 72 hours, in embodiments from about 4 hours to about 24 hours, while keeping the temperature within the operational range of the lipase being used, in embodiments from about 10° C. to about 100° C., in embodiments from about 20° C. to about 90° C., in other embodiments from about 45° C. to about 75° C.

In embodiments, the reactions illustrated by formulas (III), (IV) and (V) above may be performed directly in water.

In other embodiments a polyester emulsion may be directly produced by mixing one or more of the starting materials, enzyme, surfactant and water in a reactor to form an emulsion. More specifically, the starting materials and enzymes described above may be combined with water and one, two, or more surfactants. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the polyester resin, for example from about 0.75% to about 4% by weight of the resin, in embodiments from about 1% to about 3% by weight of the resin.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108. Yet other examples of suitable nonionic surfactants include ethoxylates of alkyl polyethylene glycol ethers based on the C10-Guerbet alcohol, including those commercially available as LUTENSOL® AT 50 from BASF.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1. an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

In forming the emulsions, the starting materials, enzyme, surfactant, and water may be combined utilizing any means within the purview of those skilled in the art. In embodiments, the reaction mixture may be nixed for from about 1 minute to about 72 hours, in embodiments from about 4 hours to about 24 hours, while keeping the temperature within the operational range of the lipase being used, in embodiments from about 10° C. to about 100° C. in embodiments from about 20° C. to about 90° C., in other embodiments from about 45° C. to about 75° C.

Where enzymatic synthesis is utilized, suitable polyesters which may be formed include, for example, poly(pentadecalactone), poly(pentadecenlactone), poly(hexadecenlactone), poly(hexadecen-7-olide), polycaprolactone, polydodecalactone, poly(pentadecalactone) co-pentadecenlactone, poly(pentadecalactone) co-hexadecenlactone, combinations thereof, and the like.

In embodiments, a coalescence inhibitor may be added to the emulsion to aid in the formation of miniemulsions, for example, minimize the formation of large particles in the emulsion and to enhance emulsion stability by preventing coalescence and Ostwald ripening. Suitable coalescence inhibitors may include one or more of the following: hydrocarbons, including alkanes or cycloalkanes, in embodiments alkanes or cycloalkanes having at least 12 carbon atoms (such as hexadecane and/or octadecane); long chain alcohols (such as hexadecanol and/or octadecanol); halogenated hydrocarbons, organosilicon compounds, long-chain esters, oils, including vegetable oils (such as olive oil), hydrophobic dye molecules, capped isocyanates, oligomeric and/or polymeric products of polymerization, polycondensation or polyaddition, such as polymeric co-stabilizers, combinations thereof, and the like. The amount of coalescence inhibitor added to the reaction mixture may be from about 0.01% weight to about 40% weight, in embodiments from about 0.1% weight to about 10% weight. The weights of hydrophobic co-stabilizer used herein are calculated relative to the total weight of the mixture prepared in the process of the invention.

Those skilled in the art will recognize that optimization of reaction conditions, temperature, and enzyme loading can be varied to generate polyesters of various molecular weights, and that structurally related starting materials may be polymerized using comparable techniques.

In embodiments, the final water-borne polyester emulsion may be utilized to form toner particles with no further treatment. In other embodiments, if the particle size of the polyester in the emulsion is too large, the emulsion may be subjected to homogenizing or sonication to further disperse the nanoparticles and break apart any agglomerates or loosely bound particles. Where utilized, a homogenizer, (that is, a high shear device), may operate at a rate of from about 6,000 rpm to about 10,000 rpm, in embodiments from about 7,000 rpm to about 9,750 rpm, for a period of time of from about 0.5 minutes to about 60 minutes, in embodiments from about 5 minute to about 30 minutes.

Resins thus produced may include particles possessing a size of from about 20 nanometers to about 1000 nanometers, in embodiments from about 50 nanometers to about 250 nanometers. The resins thus produced may have a glass transition temperature (Tg) of from about −20° C. to about 200° C. Resins thus produced may have a melting point (Tm) of from about 45° C. to about 100° C., in embodiments form about 55° C. to about 95° C. The molecular weight of the polyester may be from about 2,000 to about 50,000, in embodiments from about 3,000 to about 20,000.

The weight of the resulting polymers may depend, on the starting materials, reaction conditions, and the lipase enzyme being used. Higher temperatures, in embodiments about 60° C. or above, and longer reaction times of about forty eight (48) or more hours, may yield polymers with higher molecular weights.

Modification of Latex Resins

The aggregation and subsequent coalescence of toner particles from these latex resins in combination with colorants, waxes, other additives, and the like, is a complex process which, to be successful and robust, must delicately balance a number of key properties, including molecular weight, hydrophobicity, acid value, latex particle size, and the like, within narrowly defined ranges. These limitations may impose restrictions on the selection of materials available for use in toners, leading in some cases to higher costs, both in terms of the cost of the materials and the process.

For example, the polymer acid value (defined as the KOH-equivalent weight of neutralizable carboxylic acid groups per gram of polymer) affects the ease of emulsification and aggregation of polymer latexes. Polyesters used in low-melt toners may have acid values that are linked to molecular weight, which is itself subject to batch-to-batch variation. This variability may thus impact the economic and efficient formation of toner particles.

Wax compatibility is another issue that may be present with low-melt polyester toners. In general, polyethylene waxes can be easily incorporated into toners containing certain amorphous polyesters with highly aliphatic monomer units. However, when these monomer units are absent, wax rejection may occur during toner aggregation or coalescence and a wax-containing toner cannot be made. Wax compatibility in these materials is thus linked to monomer composition in the amorphous polymers.

In accordance with the present disclosure, the latex resins as described above may be modified prior to forming toner compositions. In embodiments, the latex resin, such as a resin having unsaturation in the polymer backbone, may be epoxidized to adjust the melting point of the resin. In embodiments, the resin may be a polyester. In embodiments, the resin may be amorphous, crystalline, or both.

For example, in embodiments, alkene-containing polyesters can be epoxidized after polymerization to adjust the polymer melting point. The epoxidized polyester resin of the present disclosure thus has an epoxy group in place of at least one alkene group in the polymer backbone.

For example, treatment of an unsaturated semi-crystalline polyester, for example poly(hexadecen-7-olide), with an epoxidizing agent, may result in the conversion of alkene units in the polymeric backbone to epoxides. Suitable epoxidizing agents include, for example, reagents such as meta-chloroperbenzoic acid (mCPBA), magnesium monoperoxyphthalate (MMPP), and hydrogen peroxide with a suitable catalyst. The amount of epoxidizing agent added to the polyester resin may be from about 1% by weight of the resin to about 200% by weight of the resin, in embodiments from about 10% by weight of the resin to about 100% by weight of the resin.

Other crystalline or amorphous resins may be similarly modified with an epoxidizing agent.

In some embodiments, the epoxidizing agent may be added to the unsaturated polyester in a solution. Suitable solvents for forming such a solution include, for example, methylene chloride, tetrahydrofuran, toluene, ethyl acetate, combinations thereof, and the like. Where utilized as a solution, the epoxidizing agent may be present at a concentration of from about 1% by weight of the solution to about 50% by weight of the solution, in embodiments from about 5% by weight of the solution to about 20% by weight of the solution.

An example of such an epoxidation reaction is set forth below in schematic VI:

In embodiments, the epoxidation of the polyester may increase its polymer melting point ($T_m$) to a temperature of from about 58° C. to about 80° C., in embodiments from about 60° C. to about 76° C. which may be very useful for use in a low melt polyester toner. Partial epoxidation may be conducted, in embodiments, to provide finer control over the polymer melting point. With partial epoxidation, only some of the unsaturated groups in the polymer backbone are epoxidized, for example, from about 1% to about 90% of the unsaturated groups, in embodiments from about 20% to about 80% of the unsaturated groups.

The epoxidized resin may have a number average molecular weight ($M_n$), as measured by gel permeation chromatography (GPC) of, for example, from about 3,000 g/mol to about 50,000 g/mol, in embodiments from about 10,000 g/mol to about 30,000 g/mol, and a weight average molecular weight ($M_w$) of, for example, from about 10,000 g/mol to about 100,000 g/mol, in embodiments from about 20,000 g/mol to about 75,000 g/mol, as determined by Gel Permeation Chromatography (GPC) using polystyrene standards.

Optionally, the chemical structure of the resulting epoxidized polyester can then be modified through the covalent (VI)

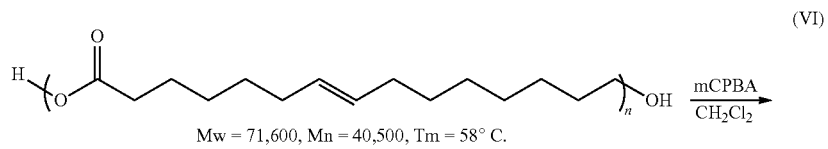

Mw = 71,600, Mn = 40,500, Tm = 58° C.

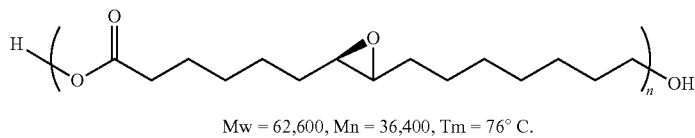

Mw = 62,600, Mn = 36,400, Tm = 76° C.

In embodiments, the epoxidation of the unsaturated polyester to form an epoxidized resin as described herein may result in an epoxidized resin having a different melting point ($T_m$) compared with the starting unsaturated polyester, without any change in the molecular weight. The change in Tm observed may depend upon the unsaturated polyester utilized, the epoxidizing agent, reaction conditions, combinations thereof, and the like, with an increase in Tm observed in some circumstances, and a decrease in Tm observed in other circumstances. Moreover, with respect to amorphous resins, the epoxidation of an unsaturated amorphous polyester in accordance with the present disclosure may result in an epoxidized resin having a different glass transition temperature (Tg) compared with the starting unsaturated polyester, without any change in the molecular weight. Here also, the change in Tg observed may depend upon the unsaturated polyester utilized, the epoxidizing agent, reaction conditions, combinations thereof, and the like, with an increase in Tg observed in some circumstances, and a decrease in Tg observed in other circumstances.

addition of a wax-like component, such as a long-chain aliphatic alcohol, a long-chain aliphatic amine, combinations thereof, and the like, by ring-opening of the epoxide group. The amount of wax-like component added to the epoxidized polyester resin may be from about 0.1% by weight of the epoxidized resin to about 50% by weight of the epoxidized resin, in embodiments from about 1% by weight of the epoxidized resin to about 20% by weight of the epoxidized resin.

In some embodiments, the wax-like component may be added to the epoxidized polyester resin in the presence of a catalyst to facilitate the ring-opening of the epoxide. Suitable catalysts include, for example, sulfuric acid, toluenesulfonic acid, activated alumina, combinations thereof, and the like.

The addition of the wax-like component may provide wax-like functionality to the polyester, providing greater wax compatibility and decreased risk of wax rejection during toner preparation. Scheme (VII) below illustrates the complete modification of an exhaustively epoxidized crystalline polyester:

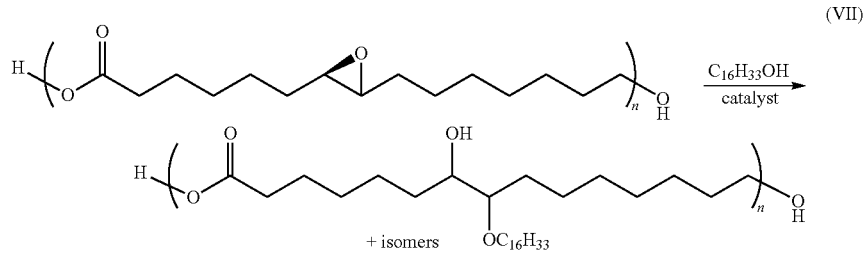

(VII)

However, in embodiments a combination of partial epoxidation and partial ring-opening of the resulting epoxides may be utilized.

In embodiments, an epoxidized resin reacted with a wax-like component may show at least one additional melting transition temperature when measured with differential scanning calorimetry (DSC). For example, an epoxidized crystalline resin with a melting transition at 70° C. that has been reacted with a wax-like component with a melting transition at 100° C. may show melting transitions at both 70° C. and 100° C. when measured with DSC.

In other embodiments, optional components possessing carboxylic acid groups may be added to the epoxidized polyester. Examples of components possessing carboxylic acid groups which may be added to the epoxidized polyester include, for example, glycolic acid, lactic acid, hydroxypropanoic acid, other hydroxyalkanoic acids, citric acid, glycine, other amino acids, combinations thereof, and the like. The amount of component possessing carboxylic acid groups added to the epoxidized polyester resin may be from about 0.1% by weight of the epoxidized resin to about 50% by weight of the epoxidized resin, in embodiments from about 1% by weight of the epoxidized resin to about 20% by weight of the epoxidized resin. In some embodiments, the components possessing carboxylic acid groups may be added to the epoxidized polyester resin in the presence of a catalyst to facilitate the ring-opening of the epoxide. Suitable catalysts include, for example, sulfuric acid, toluenesulfonic acid, activated alumina, combinations thereof, and the like.

Scheme VIII below provides an overview of this reaction:

per grain of resin to about 30 milligrams of potassium hydroxide per gram of resin, in embodiments an acid value of from about 5 milligrams of potassium hydroxide per gram of resin to about 20 milligrams of potassium hydroxide per gram of resin, a weight average molecular weight (Mw) of from about 10,000 g/mol to about 100,000 g/mol, in embodiments from about 20,000 g/mol to about 75,000 g/mol, and a number average molecular weight (Mn) of from about 3,000 g/mol to about 50,000 g/mol, in embodiments from about 5,000 g/mol to about 30,000 g/mol.

Here also, a combination of partial epoxidation and partial ring-opening of the resulting epoxides with the components possessing carboxylic acid groups may be utilized.

Utilizing the above techniques, either epoxidation alone, or in combination with the reaction with the wax-like components or the components possessing carboxylic acid groups, one may be able to adjust the chemical and physical properties of polymers used in EA toner by post-polymerization modification. The methods of the present disclosure may thus serve as a route to control molecular weight while overcoming resin-wax incompatibilities, low acid values, and other limitations of existing low-melt toners.

Toner

The resins thus produced as described above may be utilized to form toner compositions. One, two, or more toner resins may be used. In embodiments where two or more toner resins are used, the toner resins may be in any suitable ratio (e.g., weight ratio) such as for instance about 10% (first resin)/90% (second resin) to about 90% (first resin)/10% (second resin). Such toner compositions may include

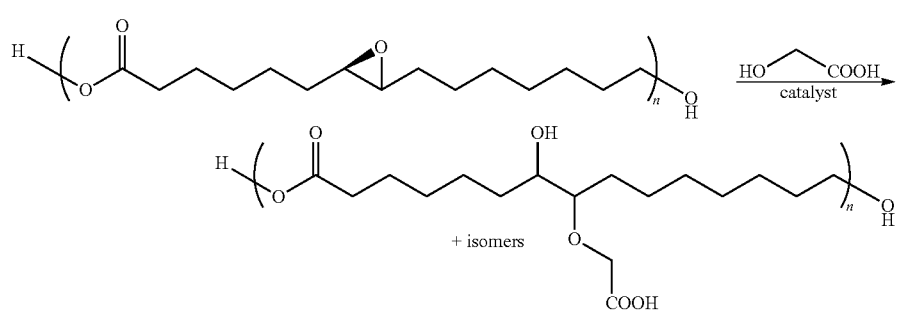

(VIII)

The addition of the component possessing carboxylic acid groups may increase the acid value of the polymer, providing a mechanism to independently control acid value and molecular weight in a polyester (these parameters are closely related in LOW MELT POLYESTER TONER resins). For example, the resin that has been epoxidized and then reacted with components possessing carboxylic acid groups may have an acid value of from about 2 milligrams of potassium hydroxide optional colorants, waxes, and other additives. Toners may be formed utilizing any method within the purview of those skilled in the art. In embodiments, the toner may include emulsion aggregation toners. Emulsion aggregation involves aggregation of both submicron latex and pigment particles into toner size particles, where the growth in particle size may be, for example, in embodiments from about 0.1 micron to about 15 microns.

Surfactants

Surfactants which may be utilized in preparing resins and toners with the processes of the present disclosure include anionic, cationic, and/or nonionic surfactants. Such surfactants may find use in forming latex resins in emulsion polymerization synthesis methods, and may also find use in forming toner particles in emulsion aggregation processes, phase inversion processes, and the like.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, mixtures thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof, as well as the amounts of each to be used, is within the purview of those skilled in the art.

Colorants

Such colorants include, for example, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals. HELIOGEN BLUE L6900™, D6840™, D7080™, D7020™, PYLAM OIL BLUE™, PYLAM OIL YELLOW™, PIGMENT BLUE 1™, available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario. NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof Examples of magentas are 2,9-dimethyl-substituted quinacridone and anthraquinone dye identified in the Color Index as CI 60710. CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF). Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Wax

Wax dispersions may also be added during formation of a latex in an emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax. Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The wax may be present in an amount of from about 0.1 to about 30 percent by weight, and in embodiments from about 2 to about 20 percent by weight of a toner including a wax, optionally in a resin utilized to form such a toner.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 4 to about 5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation of the particles, in embodiments the aggregating agent may be metered into the mixture over time. For example, the agent may be metered into the mixture over a period of from about 5 to about 240 minutes, in embodiments from about 30 to about 200 minutes, although more or less time may be used as desired or required. The addition of the agent may also be done while the mixture is maintained under stirred conditions, in embodiments from about 50 rpm to about 1,000 rpm, in other embodiments from about 100 rpm to about 500 rpm.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation/coalescence thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. The aggregation process may be conducted under shearing conditions at an elevated temperature, for example of from about 40° C. to about 90° C., in embodiments from about 45° C. to about 80° C., which may be below the glass transition temperature of the resin as discussed above.

Coalescence

Following aggregation to the desired particle size, the particles may then be coalesced to the desired final shape, the coalescence being achieved by, for example, heating the mixture to a temperature of from about 65° C. to about 105° C., in embodiments from about 70° C. to about 95° C. which may be at or above the glass transition temperature of the resin, and/or increasing the stirring, for example to from about 400 rpm to about 1,000 rpm, in embodiments from about 500 rpm to about 800 rpm. Higher or lower temperatures may be used, it being understood that the temperature is a function of the resins used for the binder. Coalescence may be accomplished over a period of from about 0.1 to about 9 hours, in embodiments from about 0.5 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

Optional additives which may be combined with a toner include any additive to enhance the properties of toner compositions. Included are surface additives, color enhancers, etc. Surface additives that can be added to the toner compositions after washing or drying include, for example, metal salts, metal salts of fatty acids, colloidal silicas, metal oxides, strontium titanates, combinations thereof, and the like, which additives are each usually present in an amount of from about 0.1 to about 10 weight percent of the toner, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972* available from Degussa. The coated silicas of U.S. Pat. Nos. 6,190,815 and 6,004,714, the disclosures of each of which are hereby incorporated by reference in their entirety, can also be selected in amounts, for example, of from about 0.05 to about 5 percent by weight of the toner, in embodiments from about 0.1 to about 2 percent by weight of the toner. These additives can be added during the aggregation or blended into the formed toner product.

Toner Particles

Toner particles produced utilizing a latex of the present disclosure may have a volume average diameter of about 1 micron to about 20 microns, in embodiments about 2 microns to about 15 microns, in embodiments about 3 microns to about 7 microns, in some embodiments about 5.9 microns. Toner particles of the present disclosure may have a circularity of from about 0.9 to about 0.99, in embodiments from about 0.92 to about 0.98, in some embodiments about 0.94.

Uses

The methods of the present disclosure may be used to prepare resins for use in subsequent synthesis of emulsion aggregation toners either in the presence or absence of solvents. Crystalline or amorphous polyester resins with a range of thermodynamic and chemical properties may be produced. In embodiments, as described above, an enzymatic synthesis may be utilized which provides for reduced reaction times and energy costs, since lipase based synthesis occurs at temperatures from about 10° C. to about 100° C., in embodiments for a period of time as short as about four hours, whereas processes with conventional catalysts may require temperatures above about 150° C. and may take at least eight or more hours.

Further, the lipase enzymes are reusable, thereby reducing the costs associate with their use. Thus, the enzymatic polymerization processes of the present disclosure, including the formation of water-borne polyester emulsions described above, are environmentally friendly by reducing the energy required for production and reducing the use of solvents by avoiding phase inversion and/or solvent flashing steps.

Imaging

Imaging methods are also envisioned with the toners disclosed herein. Such methods include, for example, some of the above patents mentioned above and U.S. Pat. Nos. 4,265,990, 4,584,253 and 4,563,408, the entire disclosures of each of which are incorporated herein by reference. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

About 1.5 grams of poly(hexadecen-7-olide) was dissolved in about 25 ml of dichloromethane to which about 2.05 grams of cold meta-chloroperbenzoic acid (mCPBA, 77% grade, obtained from Sigma-Aldrich) was added. The reaction mixture was stirred overnight, for a period of time of from about 12 hours to about 24 hours, at room temperature, then filtered to remove insoluble material. The filtrate was concentrated under reduced pressure of about 50 torr and then added to slowly stirring methanol at about 300 revolutions per minute (rpm) to induce precipitation. The resulting white, fibrous material was collected by filtration and dried.

$^1$H NMR spectroscopy showed the absence of a 5.4 ppm signal corresponding to alkene protons and the presence of a new signal at 2.6 ppm, corresponding to epoxide ring protons.

The polymer melting point (Tm) was determined by differential scanning calorimetry and the number average molecular weight (Mn) and the weight average molecular weight (Mw) were determined by gel-permeation chromatography. The analytical data obtained showed a $T_m$ of about 76.1° C., a $M_n$ of about 36,400 g/mol, and a $M_w$ 62,600 g/mol.

Example 2

Latex preparation. About 135 parts epoxidized poly(hexadecen-7-olide) are dissolved in about 1101 parts of ethyl acetate at approximately 70° C. to form a first solution. An aqueous solution of about 1.9 parts DOWFAX 2A1 (an alkyldiphenyloxide disulfonate surfactant from Dow Chemical) and about 3 parts concentrated ammonium hydroxide are dissolved in about 851 parts deionized water at about 70° C. The first solution is combined with the aqueous solution under continuous high-shear homogenization using an IKA Ultra-Turrax T50 set to about 10,000 rpm. After about 30 minutes of homogenization, the reaction mixture is distilled at about 80° C. for about two hours.

The resulting emulsion is stirred for about 8 hours and thereafter strained through a 25-micron sieve and centrifuged at about 3000 rpm for about 15 minutes. The supernatant is decanted having a yield of about 588 parts latex with about 24% solids and an average particle size of about 150 nm. This latex is referred to as Latex C in Example 3 below.

Example 3

Preparation of toner particles. In the description below, Latex A and B refer to emulsions of amorphous poly(propoxylated Bisphenol A)-co-fumaric acid with molecular weights of about 19,000 g/mol and about 53,000 g/mol, respectively, with glass transition temperatures of about 61° C. and about 56° C., respectively, with acid numbers of about 13 milligrams KOH per gram of dry resin, and with solids loadings of about 35%. Latex C is as described in Example 2.

About 230 parts Latex A, about 237 parts Latex B, about 91 parts Latex C, about 97 parts of a polyethylene wax dispersion containing about 31% solids, about 111 parts of a Pigment Blue 15:3 dispersion containing about 17% solids, about 6.7 parts Dowfax surfactant, and about 1160 parts deionized water are combined in a 2 liter reactor. This solution is adjusted to a pH of about 3.2 using 0.3M $HNO_3$ acid. To this solution is added, under homogenization at about 2000 RPM, about 64 parts of a 10% by weight aluminum sulfate solution in water. This is added dropwise over a period of about 5 minutes. The reactor is then stirred at about 500 RPM and is heated to about 40° C. to aggregate the toner particles. When the size reaches about 5 μm, a shell coating is added which includes about 130 parts Latex A, about 127 parts Latex B, about 3.2 parts Dowfax surfactant, and about 100 parts deionized water. The reaction is heated to about 50° C. When the toner particle size reaches about 5.8 μm, the pH is adjusted to about 5 using a 4% NaOH solution. The reactor RPM is then decreased to about 200 RPM, followed by the addition of about 12 parts EDTA Versene 100. The pH is then adjusted and maintained at about 7.5 and the toner solution is heated to about 85° C. When the coalescence temperature is reached, the pH is lowered to a value of about 6.9 to allow spherodization (coalescence) of the toner. After about 1.5 hours when the desired circularity of about 0.96 is obtained, the mixture is fast-cooled at a rate of about 4.5° C./minute using ice cold water. After cooling, the toner is washed and freeze-dried.

The presence of the epoxidized poly(hexadecen-7-olide) in the toner particles is detectable on analysis of the toner particles using differential scanning calorimetry (DSC). In such an analysis, in addition to other features, a melting transition will be observed at about 76° C. A comparable toner made with non-epoxidized poly(hexadecen-7-olide) will display a melting transition of about 56° C.

Example 4

About 3 grams of poly(hexadecen-7-olide-co-4-phenylcaprolactone) is dissolved in about 50 ml of dichloromethane to which about 4.1 grams of cold meta-chloroperbenzoic acid (mCPBA, 77% grade, obtained from Sigma-Aldrich) are added. The reaction mixture is stirred overnight, for a period of time of from about 12 hours to about 24 hours, at room temperature, then filtered to remove insoluble material. The organic filtrate solution is washed with water, followed by a dilute aqueous solution of sodium bicarbonate, separating the organic layer after each washing step. The isolated organic phase is then treated with anhydrous magnesium sulfate, filtered again, and the filtrate is evaporated to dryness under reduced pressure of about 50 torr to yield the epoxidized product.

[1] H NMR spectroscopy is utilized to show the absence of a 5.4 ppm signal corresponding to alkene protons and the presence of a new signal at 2.6 ppm, corresponding to epoxide ring protons.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
    contacting at least one unsaturated polyester with at least one epoxidizing agent selected from the group consisting of peroxyacids, peroxyphthalates, hydrogen peroxide with a suitable catalyst, and combinations thereof to form an epoxidized polyester resin;
    wherein the epoxidized polyester resin has a melting point of from about 58° C. to about 80° C., a number average molecular weight of from about 3,000 g/mol to about 50,000 g/mol, and a weight average molecular weight of from about 10,000 g/mol to about 100,000 g/mol;
    contacting the epoxidized polyester resin with at least one colorant, an optional wax, and an optional surfactant to form toner particles; and
    recovering the toner particles.

2. A process as in claim 1, wherein the at least one unsaturated polyester is selected from the group consisting of poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), poly(pentadecalactone), poly(pentadecenlactone), poly(hexadecenlactone), poly(hexadecen-7-olide), polycaprolactone, polydodecalactone, poly(pentadecalactone co-pentadecenlactone), poly(pentadecalactone co-hexadecenlactone), and combinations thereof.

3. A process as in claim 1, wherein the epoxidizing agent is selected from the group consisting of meta-chloroperbenzoic acid, magnesium monoperoxyphthalate, hydrogen peroxide and a suitable catalyst, in an amount of from about 1% by weight of the polyester to about 200% by weight of the polyester.

4. A process as in claim 1, wherein from about 1% to about 90% of the unsaturated groups in the polymer backbone are epoxidized, and wherein the epoxidized polyester resin has a different melting point than the at least one unsaturated polyester.

5. A process as in claim 1, further comprising contacting the epoxidized polyester resin with a wax-like component selected from the group consisting of long-chain aliphatic alcohols, long-chain aliphatic amines, and combinations thereof, in an amount of from about 0.1% by weight of the epoxidized resin to about 50% by weight of the epoxidized polyester resin.

6. A process as in claim 1, further comprising contacting the epoxidized polyester resin with a component possessing carboxylic acid groups selected from the group consisting of glycolic acid, lactic acid, hydroxypropanoic acid, other hydroxyalkanoic acids, citric acid, glycine, other amino acids, and combinations thereof, in an amount of from about 0.1% by weight of the epoxidized resin to about 50% by weight of the epoxidized polyester resin.

7. A process as in claim 6, wherein the epoxidized polyester resin that has been contacted with the component possessing carboxylic acid groups has an acid value of from about 2 milligrams of potassium hydroxide per gram of resin to about 30 milligrams of potassium hydroxide per gram of resin, a weight average molecular weight of from about 10,000 g/mol to about 100,000 g/mol, and a number average molecular weight of from about 3,000 g/mol to about 50,000 g/mol.

8. A process comprising:
contacting at least one unsaturated polyester with at least one epoxidizing agent selected from the group consisting of peroxyacids, peroxyphthalates, hydrogen peroxide and a suitable catalyst, and combinations thereof to form an epoxidized polyester resin;
contacting the epoxidized polyester resin with a component selected from the group consisting of wax-like components and components possessing carboxylic acid groups to form a modified epoxidized polyester resin;
wherein the epoxidized polyester resin has a melting point of from about 58° C. to about 80° C., a number average molecular weight of from about 3,000 g/mol to about 50,000 g/mol, and a weight average molecular weight of from about 10,000 g/mol to about 100,000 g/mol;
contacting the modified epoxidized polyester resin with at least one colorant, an optional wax, and an optional surfactant to form toner particles; and
recovering the toner particles.

9. A process as in claim 8, wherein the at least one unsaturated polyester is selected from the group consisting of poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), poly(pentadecalactone), poly(pentadecenlactone), poly(hexadecenlactone), poly(hexadecen-7-olide), polycaprolactone, polydodecalactone, poly(pentadecalactone co-pentadecenlactone), poly(pentadecalactone co-hexadecenlactone), and combinations thereof.

10. A process as in claim 8, wherein the epoxidizing agent is selected from the group consisting of meta-chloroperbenzoic acid, magnesium monoperoxyphthalate, and hydrogen peroxide with a suitable catalyst, in an amount of from about 1% by weight of the polyester to about 200% by weight of the polyester.

11. A process as in claim 8, wherein from about 1% to about 90% of the unsaturated groups in the polymer backbone are epoxidized.

12. A process as in claim 8, wherein the wax-like component is selected from the group consisting of long-chain aliphatic alcohols, long-chain aliphatic amines, and combinations thereof, in an amount of from about 0.1% by weight of the epoxidized resin to about 50% by weight of the epoxidized resin.

13. A process as in claim 8, wherein the component possessing carboxylic acid groups is selected from the group consisting of , glycolic acid, lactic acid, hydroxypropanoic acid, other hydroxyalkanoic acids, citric acid, glycine, other amino acids, and combinations thereof, in an amount of from about 0.1% by weight of the epoxidized resin to about 50% by weight of the epoxidized resin.

14. A process as in claim 13, wherein the modified epoxidized resin that has been contacted with the component possessing carboxylic acid groups has an acid value of from about 2 milligrams of potassium hydroxide per gram of resin to about 30 milligrams of potassium hydroxide per gram of resin, a weight average molecular weight of from about 10,000 g/mol to about 100,000 g/mol, and a number average molecular weight of from about 3,000 g/mol to about 50,000 g/mol.

15. A toner comprising:
an epoxidized polyester resin optionally in combination with at least one other resin selected from the group consisting of amorphous polyester resins and crystalline polyester resins;
wherein the epoxidized polyester resin has a melting point of from about 58° C. to about 80° C., a number average molecular weight of from about 3,000 g/mol to about 50,000 g/mol, and a weight average molecular weight of from about 10,000 g/mol to about 100,000 g/mol; and
one or more optional ingredients selected from the group consisting of colorants, waxes, and combinations thereof.

16. A toner as in claim 15, wherein the epoxidized resin comprises a modified epoxidized resin including the epoxidized resin in combination with a component selected from the group consisting of wax-like components and components possessing carboxylic acid groups, and wherein the epoxidized polyester resin has a different melting point than a polyester resin that has not been epoxidized.

17. A toner as in claim 16, wherein the wax-like component is selected from the group consisting of long-chain aliphatic alcohols, long-chain aliphatic amines, and combinations thereof, in an amount of from about 0.1% by weight of the epoxidized resin to about 50% by weight of the epoxidized resin.

18. A toner as in claim 16, wherein the component possessing carboxylic acid groups is selected from the group consisting of , glycolic acid, lactic acid, hydroxypropanoic acid, other hydroxyalkanoic acids, citric acid, glycine, other amino acids, and combinations thereof, present in an amount of from about 0.1% by weight of the epoxidized resin to about 50% by weight of the epoxidized resin, and wherein the modified epoxidized resin has an acid value of from about 2 milligrams of potassium hydroxide per gram of resin to about 30 milligrams of potassium hydroxide per gram of resin.

19. A toner as in claim 15, wherein particles comprising the toner have a volume average diameter of from about 1 micron to about 20 microns, and a circularity of from about 0.9 to about 0.99.

\* \* \* \* \*